(12) United States Patent
Bernard et al.

(10) Patent No.: US 11,905,991 B2
(45) Date of Patent: Feb. 20, 2024

(54) COMPOSITE END CONNECTIONS

(71) Applicant: Crompton Technology Group Limited, Solihull (GB)

(72) Inventors: James William Bernard, Brackley (GB); Jon Pethick, Leicestershire (GB); Robert Edwin Finney, Charlbury (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 209 days.

(21) Appl. No.: 17/161,943

(22) Filed: Jan. 29, 2021

(65) Prior Publication Data
US 2021/0231164 A1   Jul. 29, 2021

(30) Foreign Application Priority Data
Jan. 29, 2020   (EP) .................................... 20275019

(51) Int. Cl.
*F16C 3/02*   (2006.01)

(52) U.S. Cl.
CPC .................................. *F16C 3/026* (2013.01)

(58) Field of Classification Search
CPC ........ F16B 4/004; F16B 17/004; F16C 3/023; F16C 3/026; F16C 7/026; F16D 1/0852; F16D 1/09; F16D 1/092; F16D 2001/0903
USPC ........................................ 464/181, 182, 183
See application file for complete search history.

(56) References Cited

U.S. PATENT DOCUMENTS

| | | | | |
|---|---|---|---|---|
| 4,256,412 A | * | 3/1981 | Tybus | F16C 7/026 403/267 |
| 4,319,076 A | * | 3/1982 | Piur | H01B 17/40 285/55 |
| 4,451,245 A | * | 5/1984 | Hornig | F16C 3/026 464/181 |
| 4,732,634 A | * | 3/1988 | Hill | F17C 1/16 156/173 |
| 5,160,392 A | * | 11/1992 | Thongs, Jr. | B29C 70/86 156/175 |
| 5,213,379 A | * | 5/1993 | Taniguchi | B29C 70/207 138/140 |

(Continued)

FOREIGN PATENT DOCUMENTS

| | | | | |
|---|---|---|---|---|
| DE | 3641632 A1 | * | 6/1988 | F16C 3/026 |
| EP | 3203094 A1 | | 8/2017 | |

(Continued)

OTHER PUBLICATIONS

Extended European Search Report for International Application No. 20275019.6 dated Jul. 8, 2020, 10 pages.

*Primary Examiner* — Josh Skroupa
(74) *Attorney, Agent, or Firm* — CANTOR COLBURN LLP

(57) ABSTRACT

A fibre-reinforced polymer composite shaft for transmitting loads along a central axis is provided. The composite shaft comprises a first interface surface extending along the central axis and comprising at least one helical groove and/or a plurality of circumferential grooves for engaging with at least one corresponding helical ridge and/or a plurality of corresponding circumferential ridges of a second interface surface of an end fitting. The at least one helical groove and/or the plurality of circumferential grooves comprises at least one flank with a flank angle of between 32° and 51°. In such an assembly, a preload structure is arranged to provide a radial biasing force to bias the first interference surface against the second interference surface.

19 Claims, 8 Drawing Sheets

(56) References Cited

U.S. PATENT DOCUMENTS

| | | | |
|---|---|---|---|
| 5,309,620 A | | 5/1994 | Shinohara et al. |
| 5,601,493 A | * | 2/1997 | Nakazono ............... F16C 3/026 |
| | | | 464/181 |
| 7,731,593 B2 | * | 6/2010 | Dewhirst ................ F16C 3/026 |
| | | | 464/181 |
| 7,874,925 B2 | * | 1/2011 | Dewhirst ................ F16C 3/026 |
| | | | 464/181 |
| 8,876,614 B2 | | 11/2014 | Nakamura et al. |
| 9,695,925 B2 | * | 7/2017 | Toyodome ........... F16C 3/026 |
| 10,184,509 B2 | | 1/2019 | Pollitt et al. |
| 10,527,086 B2 | * | 1/2020 | Bernard ................ F16C 3/026 |
| 11,067,114 B2 | * | 7/2021 | Bernard ................ F16C 3/026 |
| 2002/0195291 A1 | * | 12/2002 | Nonogaki ............... F16C 3/026 |
| | | | 180/337 |
| 2017/0227058 A1 | | 8/2017 | Pollitt |
| 2018/0283458 A1 | * | 10/2018 | Bernard ................ F16C 3/026 |
| 2019/0003522 A1 | | 1/2019 | Bernard et al. |

FOREIGN PATENT DOCUMENTS

| | | | | |
|---|---|---|---|---|
| EP | 3382219 A1 | | 10/2018 | |
| EP | 3473874 A1 | * | 4/2019 | ............ F16C 3/023 |
| EP | 3486503 A1 | | 5/2019 | |
| FR | 2613790 A1 | * | 10/1988 | ............ F16C 3/026 |
| JP | 04347006 A | * | 12/1992 | ............ F16C 3/026 |
| JP | H0747973 B2 | * | 5/1995 | ............ F16C 3/026 |
| JP | 02236013 A | * | 9/1998 | ............ F16C 3/023 |
| SU | 1742090 A1 | * | 6/1992 | ........ B29C 37/0082 |

\* cited by examiner

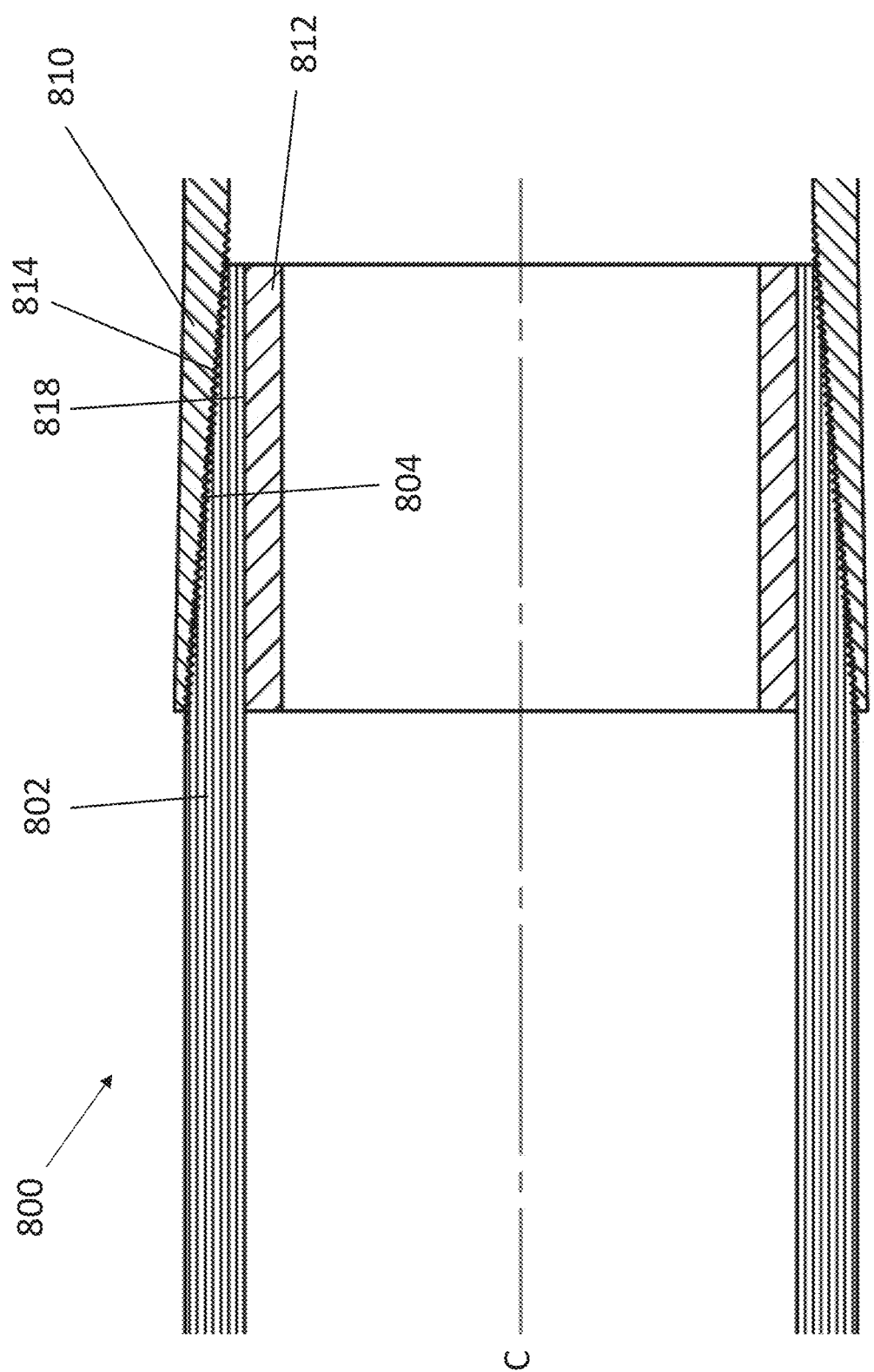

COMPOSITE END CONNECTIONS

FOREIGN PRIORITY

This application claims priority to European Patent Application No. 20275019.6 filed Jan. 29, 2020, the entire contents of which is incorporated herein by reference.

TECHNICAL FIELD

The present disclosure relates to fibre reinforced polymer (FRP) composite shafts, and to joints between FRP composite shafts and end fittings. This disclosure is particularly concerned with FRP composite shafts and assemblies for transmitting axial loads.

BACKGROUND

Composite structural components are typically made of a polymer matrix composite material, often a fibre reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example rods and struts, are ideal candidates for polymer matrix composite material and such composite structural components are increasingly being used on commercial aircraft in addition to automotive and construction industries. These composite structural components generally require an end connection having a complex form to interface with other components. Metals are efficient in terms of weight and cost for forming an end connection having a complex geometry. However, joining a composite structural component to a metallic component to form an end connection poses significant challenges, especially in the aerospace industry where the joint must be formed in a robust and certifiable manner.

EP 3203094 describes joints in which end fittings are attached to composite shafts. In such joints the transmission of forces between the composite shaft and the end fitting is partly through the engagement of teeth (helical teeth or axial splines) provided on the metal end fitting with corresponding grooves in the composite shaft, and partly through friction between flat metal lands provided on the metal end fitting and the composite shaft. EP 3382219 describes another joint in which a preload structure in an interference fit is used to apply a radial biasing force between the composite shaft and the end fitting. In these joints, the teeth are formed as a helical thread (for axial load transmission) or axial splines (for torsional loads). The end fitting is engaged with the composite shaft along an interface region (a generally axially extending region in which the two parts are radially overlapped and in contact with one another) by helical threads and/or axial splines.

In the prior art there can be seen a tooth profile that may be used for the helical threads and/or axial splines in composite to metal joints. The tooth profile typically has a flank angle of 30° so as to match the common ISO metric screw threads of a standard metal end fitting.

There remains a need for an improved approach to mounting end fittings to composite shafts.

SUMMARY

According to a first aspect of the present disclosure there is provided a fibre reinforced polymer composite shaft for transmitting loads along a central axis, the composite shaft comprising: a first interface surface extending along the central axis and comprising at least one helical groove with and/or a plurality of circumferential grooves for engaging with at least one corresponding helical ridge and/or a plurality of corresponding circumferential ridges of a second interface surface of an end fitting; wherein the at least one helical groove and/or the plurality of circumferential grooves comprises at least one flank with a flank angle of between 32° and 51°.

The present disclosure extends to an assembly for transmitting loads along a central axis, the assembly comprising: a fibre reinforced polymer composite shaft as disclosed herein; an end fitting comprising a second interface surface extending along the central axis and comprising at least one corresponding helical ridge and/or a plurality of corresponding circumferential ridges that is engaged with the at least one helical groove and/or the plurality of circumferential grooves so as to mount the end fitting to the fibre reinforced polymer composite shaft; and a preload structure arranged to provide a radial biasing force to bias the first interference surface against the second interference surface.

It has been found that selecting the flank angle of the at least one helical groove and/or the plurality of circumferential grooves to be between 32° and 51° gives a surprising improvement compared to a standard flank angle of 30°. Metal end fittings commonly employ standardised ISO or ANSI screw threads (e.g. "M" series threads, as defined in international standard ISO 68-1). The threads are symmetrically V-shaped with the flanks separated by an angle of 60°, i.e. flank angles of 30°.

Starting from a standard flank angle of 30°, and looking to increase the ability to transmit axial loads without slip occurring at the first interface surface, the inventors have realised that increasing the flank angle would require a higher radial biasing force from a preload structure arranged to bias the first interference surface against a second interference surface of an end fitting. This higher radial biasing force can help to increase the apparent ultimate strength of the composite material allowing a higher axial load to be transferred through the joint. Further, higher radial biasing force associated with increased flank angles can reduce bending displacements at the edges of the joint, creating a more even load transmission across the flanks, later slip onset and a better fatigue performance. It has been found that a discernible improvement starts at a flank angle of about 32°. The flank angle may be defined as the angle between a flank of a groove and a perpendicular to the central axis.

The inventors have also appreciated that, as the radial biasing force increases with flank angle, typically so does the weight of the preload structure. However, it has been further appreciated by the inventors that increasing the flank angle does provide a benefit in terms of improving the axial load capacity and this can be balanced against the extra weight of the preload structure required to increase the radial biasing force. It has been found that the improvement can be justified relative to the expected weight increase for a flank angle up to about 51°.

In one or more examples, the flank angle is at least 32°, 33°, 34°, 35°, 36°, 37°, 38° or 39°. In one or more examples, in addition or alternatively, the flank angle is no more than 51°, 50°, 49°, 48°, 47°, 46°, 45°, 44°, 43°, 42° or 41°.

Taking into account a general aim to keep the fibre-reinforced polymer composite shaft light in weight, especially for aerospace applications, it might be expected to keep the flank angle at "sharp" angles close to 30°. Thus, in at least some examples, the at least one helical groove and/or the plurality of circumferential grooves comprises at least one flank with a flank angle of between 32° and 36°. In at least some examples, the flank angle may be between 32° and 33°.

In addition to the considerations above, it is appreciated that friction at the first interface surface is important for determining the magnitude of axial load that is transmitted at the flank of each groove before the onset of slip. Furthermore, the inventors have realised that friction can be difficult to control, especially in service, due to environmental factors such as temperature, contaminants, etc. When optimising a composite shaft for axial load transmission, it is desirable for any joint with an end fitting to reliably withstand a given axial load regardless of changes in friction. Thus, in at least some examples, the at least one helical groove and/or the plurality of circumferential grooves comprises at least one flank with a flank angle of between 34° and 48°. In at least some examples, the flank angle is between 34° and 44°.

It has been found that selecting the flank angle of the at least one helical groove and/or the plurality of circumferential grooves to be between 34° and 48°, or between 34° and 44°, allows the weight of the assembly to be reduced whilst still providing the same axial load capacity (or equivalently allows the axial load capacity of the assembly to be increased without increasing its weight) and being relatively insensitive to changes in the frictional force between the first and second interface surfaces (which can often happen during use of such an assembly, e.g., due to changes in environmental conditions such as temperature and/or contamination with lubricating materials). The inventors have recognised that a flank angle in this range improves the load distribution over the first and second interface surfaces (i.e. reducing areas of particularly high load that may fail before other areas have reached full load capacity) even when the coefficient of friction between the first and second interface surfaces varies from its nominal (i.e. expected) value.

Whilst any flank angle (i.e. the angle between a flank of the groove(s) and a perpendicular to the central axis) between 34° and 48° provides an improved performance over conventional joints between composite shafts and end fittings, it has been found that the flank angle may particularly be selected between 37° and 44° in some examples, or between 38° and 42° in some examples, or between 39° and 41° in some examples. In at least some examples, a flank angle of approximately 38°, 39° or 40° may be particularly beneficial, with the benefit tending to increase as a flank angle of approximately 38° to 40° is approached. In at least some examples, the flank angle may be between 35° and 43°, between 36° and 42°, between 37° and 41° or between 38° and 40°.

It is envisaged that the benefit of selecting a flank angle in one of the abovementioned ranges may be realised for a wide range of sizes and configurations of fibre reinforced polymer composite shafts. However, in some preferred examples the first interface surface comprises an average radius from the central axis of between 10 and 150 mm and preferably an average radius from the central axis of approximately 20-30 mm (e.g. 22-23 mm). Similarly, the first interface surface may comprise a length (measured generally along the central axis) of between 15 mm and 150 mm or more. In some examples, the first interface surface is approximately 30 mm long.

In examples featuring at least one helical groove, it may desirable to make the at least one helical groove (and the corresponding helical ridge) as perpendicular as possible to the central axis to maximise the efficiency of force transfer in the axial direction (i.e. for tension/compression). For example, the helical groove may extend at an angle to the central axis of between 60° and 89°, preferably between 85° and 89°.

The first interface surface may comprise a plurality of helical grooves, e.g. as a multi-start thread with multiple adjacent helical grooves interleaved with one another. The multi-start thread may have advantages in reducing the number of turns required to mount the end fitting onto the shaft, but it may require a reduction in the angle between the threads and the central axis (i.e. the threads must be less perpendicular to the shaft axis) which may not be optimal for axial load transmission.

The first interface surface may comprise an inner surface of the composite shaft (e.g. an inside surface of a hollow cylindrical shaft). In such examples the assembly may be arranged such that the second interface surface is located radially inward of the first interface surface. In some such examples, the preload structure may be arranged radially outwards of the first interface surface. For example, the preload structure may comprise an annular member (e.g. a hoop ring) arranged to apply the radial biasing force to an outer surface of the composite shaft (e.g. arranged around the outside of a hollow cylindrical shaft).

Alternatively, the first interface surface may comprise an outer surface of the composite shaft (e.g. an outer surface of a hollow cylindrical shaft). In such examples the assembly may be arranged such that the second interface surface is located radially outward of the first interface surface. In some such examples, the preload structure may be arranged radially inwards of the first interface surface. For example, the preload structure may comprise a plug arranged to apply the radial biasing force to an inner surface of the composite shaft (e.g. inserted into a hollow cylindrical shaft).

The preload structure may be made of any suitable material that is capable of providing the radial biasing force. In some examples, the preload structure is made of a metallic material. In some examples, in addition or alternatively, the preload structure is made of a polymer matrix composite material, for example a fibre reinforced polymer material. In some examples, the preload structure may comprise one or more materials chosen from: metals, alloys (with or without fibre reinforcement), fibre-reinforced polymers or fibre-reinforced resins. The preload structure may comprise a simple ring or support plug which can be cut from a longer cylinder of suitable material. Therefore several such preload structures could be formed and cut from a single unit, reducing the cost per unit.

In at least some examples, the preload structure may be arranged to provide the radial biasing force through an interference fit with the composite shaft, i.e., the preload structure may be sized so that when it is applied to the composite shaft (e.g. pushed around the exterior or pushed into the interior of the shaft) it causes a deformation in the shaft, thus compressing the FRP composite material of the shaft against the end fitting. The composite shaft may thus be sandwiched between the preload structure and the end fitting in a preloaded state.

The degree of interference fit may be chosen to apply a desired level of preload to the joint interface surfaces. The degree of interference fit may be chosen taking into account operational factors such as the expected or intended axial loads to be transmitted during use. In addition, or alternatively, the degree of interference fit may be chosen taking into account structural factors such as the diameter and/or wall thickness of the composite shaft. In addition, or alternatively, the degree of interference fit may be chosen taking into account factors that affect the strength of the composite shaft, such as the void content, volume fraction of fibre, fibre stiffness e.g. elastic modulus, and/or selected layup of the fibre reinforced polymer composite material—one or more of which may dictate the level of preload required. In some examples, the interference fit between the preload structure and the composite shaft may be at least 80 μm, optionally at least 100 μm, optionally at least 150 μm. This distance represents the size difference (i.e. overlap) between the size of the preload structure and the corresponding dimension of the composite shaft to which it is to be applied. At the other end of the range, the interference fit between the preload structure and the composite shaft may be up to 500 μm, or in some rare cases up to 2400 μm.

The radial biasing force may also be generated by shrinking or expanding the preload structure (e.g. through heating, cooling, or applying some other physical or chemical process to the preload structure) after it is applied to the composite shaft to cause a deformation in the shaft and thus compressing the FRP composite material of the shaft against the end fitting. Such a method may not require an initial mismatch (i.e. before assembly) between the dimensions of the preload structure and the composite shaft as is used to produce a typical interference fit.

As explained above, the at least one helical groove and/or the plurality of circumferential grooves with a flank angle in the abovementioned range(s) provides an improved axial load capacity even when variation in the frictional force between the first and second interface surfaces is uncertain (i.e. when the coefficient of friction between the first and second interface surfaces changes from an expected value). However, in at least some examples, the assembly is arranged (e.g. through selection and/or surface treatment of materials and/or the use or absence of a lubricating material) such that the nominal coefficient of friction (i.e. the expected coefficient of friction in use) between the first and second interface surfaces is between 0.01 and 0.5 (e.g. between 0.01 and 0.3, between 0.05 and 0.3, between 0.1 and 0.25 or between 0.01 and 0.15). Preferably the coefficient of friction between the first and second interface surfaces is approximately 0.15 in some examples.

In some sets of examples, the composite shaft comprises carbon and/or glass fibre-reinforced polymer (e.g. formed by filament winding and/or injection moulding techniques). In some examples the composite shaft may be a multi-layer filament shaft. For example a filament-wound shaft may typically be formed by winding filaments around a mandrel in a helix (with varying helix angle, depending on application) back and forth so as to build up multiple layers of filaments to the desired thickness. As described above, different layers may be formed with different helix angles to give different properties to the finished product. The wound filaments are normally wet-out or coated in resin so as to form a matrix of resin and filaments that is cured to solidify and form the final composite shaft.

In some examples the end fitting comprises a metal, such as steel, titanium or aluminium. In some examples the end fitting is metallic (i.e. it consists of metal). In some examples, in addition or alternatively, the first and/or second interface surfaces may comprise a coating (e.g. a metallic and/or polymer coating).

In some examples, the first interface surface may extend substantially parallel to the central axis (i.e. the first interface surface may comprise a cylindrical surface). In at least some examples, the first interface surface is a cylindrical surface. Alternatively, the first interface surface may be tapered relative to the central axis (i.e. extending at least partially towards or away from the central axis, e.g. comprising a frustoconical surface). In at least some examples, the first interface surface is a frustoconical surface. In some examples, the taper of the first interface surface is at an angle to the central axis of no more than 20°, optionally no more than 15°, optionally no more than 10°, optionally no more than 7°, optionally no more than 5°. In some examples, the taper of the first interface surface is at an angle of approximately 4° to the central axis.

A tapered first interface surface may be formed by cutting or grinding (or by any other material removal process) away material from a non-tapered surface (e.g. a cylindrical surface). In examples where the composite shaft is a multi-layer filament shaft (i.e. formed by filament winding), the process of tapering the first interface surface may expose a plurality of layers of filaments (fibres), meaning that all or most layers of fibres (typically helical layers of fibres) that form the composite shaft may be engaged with the end fitting, thus ensuring excellent load sharing of forces between the end fitting and the composite shaft. Distributing the applied forces across more fibres, in particular across more fibre layers of the composite shaft, greatly increases the strength of the joint.

In such examples the second interface surface may have a corresponding or similar shape, although the shapes of the first and second surfaces do not need to correspond exactly to effectively engage with one another so as to mount the end fitting to the composite shaft. For example, the first interface surface may be slightly longer or shorter than the second interface surface.

The first interface surface may be located at one end of the composite shaft, although this is not required and in some examples the end fitting may be mounted to any section of the shaft at or away from an end.

The present disclosure extends to a method of forming an assembly for transmitting loads along a central axis, the method comprising: forming at least one helical groove and/or a plurality of circumferential grooves comprising at least one flank with a flank angle of between 32° and 51° in a first interface surface of a fibre-reinforced polymer composite shaft; forming at least one corresponding helical ridge and/or a plurality of corresponding circumferential ridges in a second interface surface of an end fitting; engaging the at least one helical groove and/or the plurality of circumferential grooves of the first interface surface with the at least one corresponding helical ridge and/or the plurality of corresponding circumferential ridges of the second interface surface so as to mount the end fitting to the composite shaft; and engaging the composite shaft with a preload structure so as to bias the first interface surface against the second interface surface with a radial biasing force.

By applying the preload structure in a subsequent operation (i.e. after the end fitting is mounted to the composite shaft), the radial biasing force that is applied by the preload structure does not impede the mounting of the end fitting to the composite shaft and does not add to the friction and heat generation that is involved in that mounting process. Instead, the joint is formed under minimal stress conditions, thus allowing the composite shaft to be constructed only to withstand this reduced stress. The preload structure then adds a preload to the already formed joint assembly, thus increasing its fatigue resistance and by placing the shaft into an advantageous residual stressed state prior to any operational loads increases the joint strength in the assembly.

In examples in which at least one helical groove is formed in the first interface surface, engaging the at least one helical groove with the at least one corresponding helical ridge may comprise screwing (i.e. rotating) the end fitting into or onto the composite shaft.

In examples in which a plurality of circumferential grooves are formed in the first interface surface, engaging the plurality of circumferential grooves with the plurality of corresponding circumferential ridges may comprise placing the end fitting onto or into the composite shaft in one or more stages (e.g. with the end fitting comprising two or more sections).

In some examples, the end fitting may comprise a monolithic structure (e.g. machined from a single piece of material such as metal). However, in some examples the end fitting may comprise two or more sections that join together to from the complete second interface surface. In such examples the method comprises applying one section to the composite shaft then applying the other section before joining the sections together (e.g. using temporary/reversible means such as clips or bolts, or using permanent means such as an adhesive or welding) to fully engage the first interface surface with the second interface surface. This allows the end fitting to be mounted to the composite shaft even when it is not possible to screw the end fitting onto the composite shaft (e.g. if circumferential grooves/ridges are used and/or if the location of mounting prevents the end fitting from being screwed on).

It will be appreciated that the fibre reinforced polymer composite shafts disclosed herein are for transmitting loads along a central axis, that is, for transmitting axial loads. Any types of non-axial load, for example torque or torsional loads that apply a force around a central axis, may be transmitted to a degree but such loads have not been taken into consideration when selecting or optimising the flank angle as described herein.

The composite shaft described above may act as an actuator rod or other axial force transmission component. It will be appreciated that the assembly described herein may be used in a wide range of applications, wherever axial load transmission elements (i.e. tension/compression elements) may be used. Some example applications include aerospace applications such as piston rods, struts, control actuators, etc.

There is disclosed herein an example where the fibre reinforced polymer composite shaft, comprising one or more of the features described above, is a tubular shaft. The tubular shaft may comprise a cylindrical tube. In such examples, the cylindrical tube may have an internal diameter in the range of 40 to 50 mm, for example an internal diameter of about 45 mm. In addition, or alternatively, in such examples the cylindrical tube may have a wall thickness in the range of 2 to 20 mm, for example a wall thickness of about 3 mm. The first interface surface may be an inner or outer surface of the cylindrical tube having such a wall thickness. As mentioned above, the first interface surface may have a length in the range of 15 to 60 mm, for example a length of about 30 mm. The cylindrical tube may have a length of at least 10 cm, 20 cm, 30 cm, 40 cm, or 50 cm and may even have a length of at least 1 m, 2 m, 3 m or more.

Features of any aspect or example described herein may, wherever appropriate, be applied to any other aspect or example described herein. Where reference is made to different examples, it should be understood that these are not necessarily distinct but may overlap. It will be appreciated that all of the preferred features of the composite shaft according to the first aspect described above may also apply to the other aspects of the disclosure.

DETAILED DESCRIPTION

One or more non-limiting examples will now be described, by way of example only, and with reference to the accompanying figures in which:

FIG. 8 is a cross sectional view of an assembly according to another example of the present disclosure.

DETAILED DESCRIPTION

Figure 1:
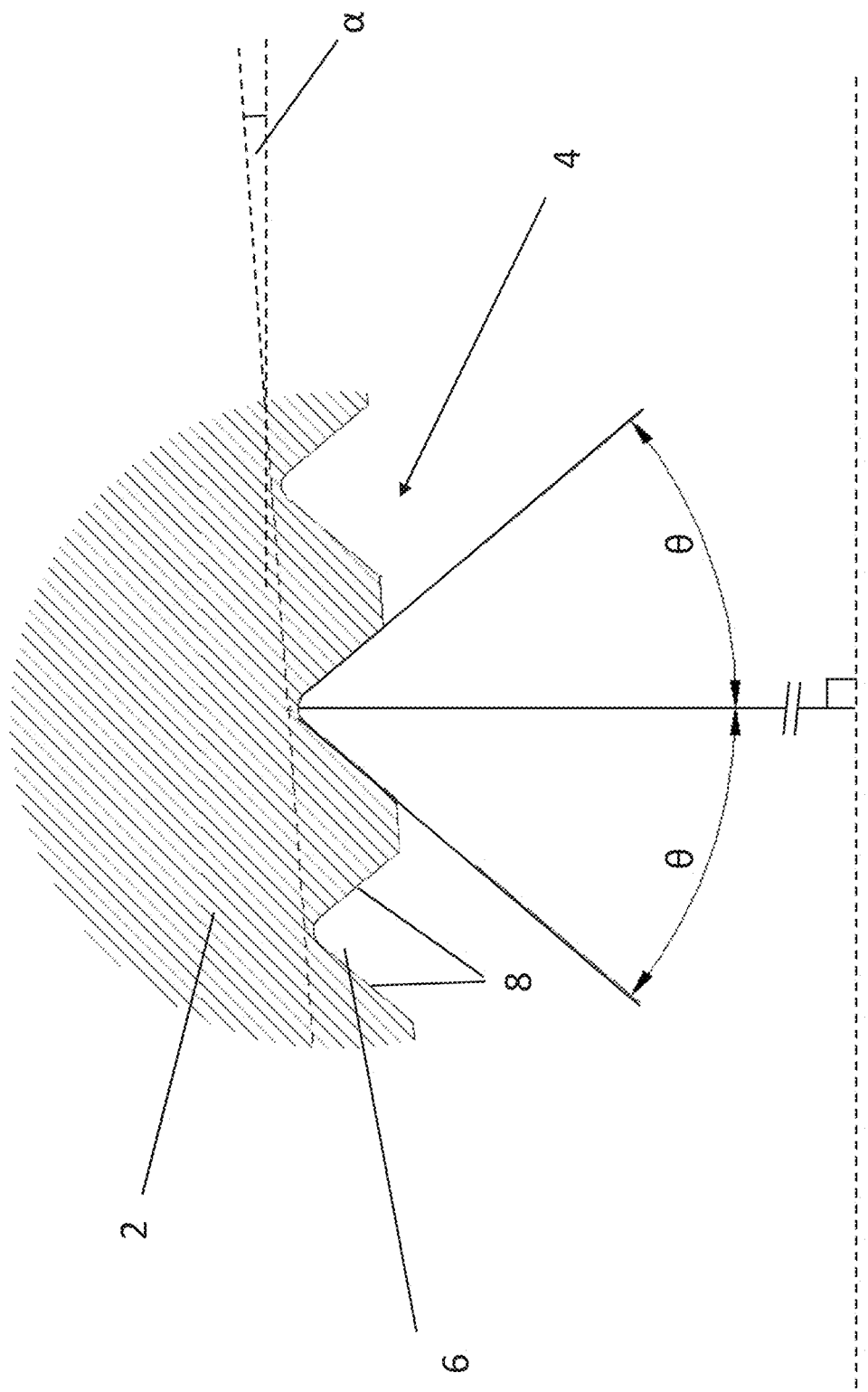
FIG. 1 is a partial cross sectional view of a composite shaft according to an example of the present disclosure.
Figure 4:
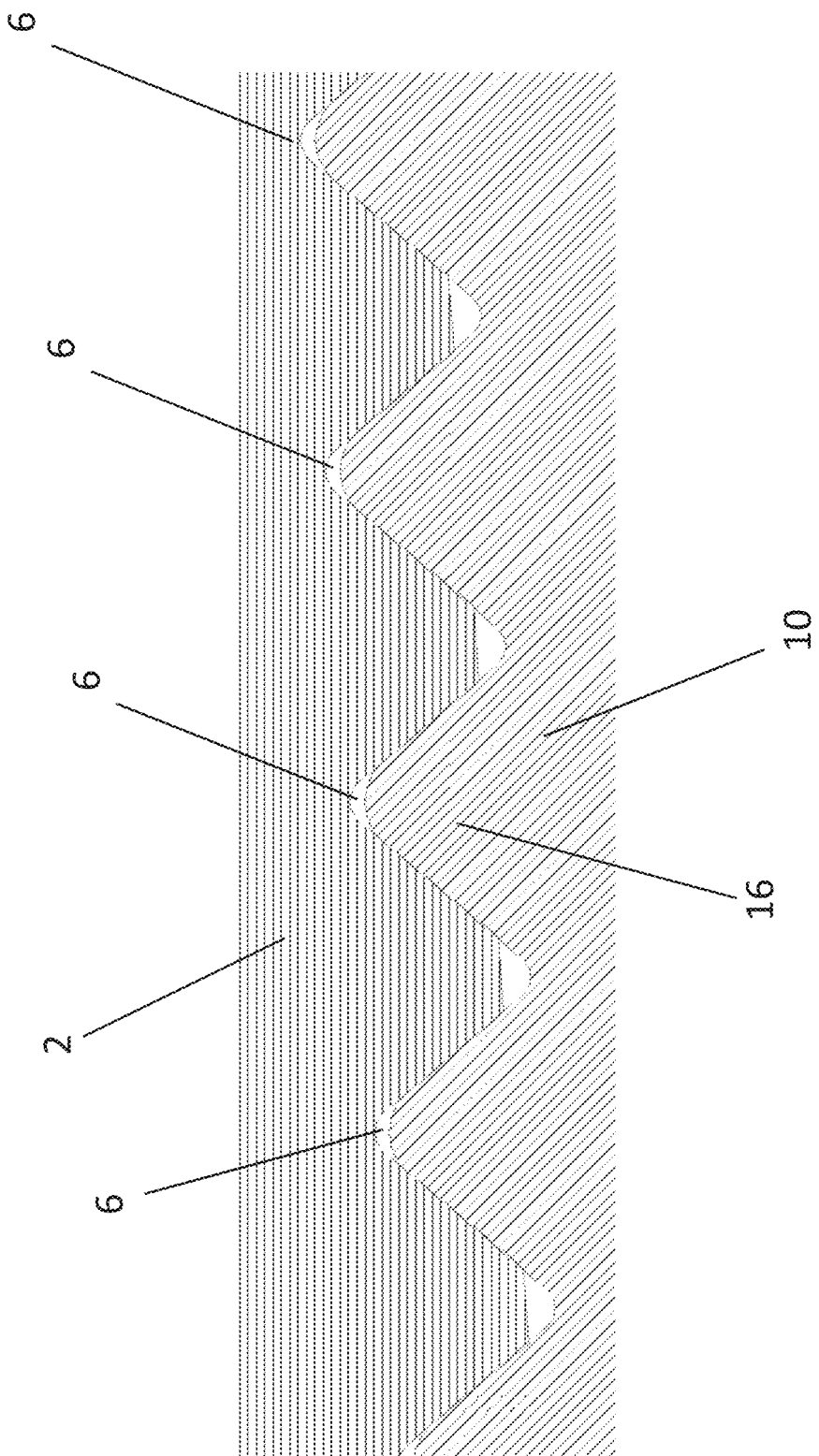
FIG. 4 is a magnified view of the assembly shown in FIG. 2.

A fibre reinforced polymer composite shaft 2 according to an example of the present disclosure is shown in FIG. 1. The composite shaft 2 comprises a first interface surface 4 that extends along a central axis C. Although not shown in the cross sectional view of FIG. 1, the composite shaft 2 comprises a hollow cylinder that is substantially symmetrical about the central axis C, with the first interface surface 4 comprising the inner surface of the hollow cylinder. FIG. 4 shows the first interface surface 4 comprising a series of adjacent grooves 6, which may be the result of a single helical groove 6 (or several interleaved helical grooves) passing several times around the circumference of the first interface surface 4, or simply due to the first interface surface 4 comprising several (separate) circumferential grooves 6.

The grooves 6 comprise a triangular cross section with two flanks 8. The angle θ between the surface of each flank 8 and a perpendicular to the central axis C (i.e. the flank angle) is approximately 40°. In this example the grooves 6 are substantially symmetric about the perpendicular to the central axis C (i.e. both flanks 8 of the groove 6 have the same flank angle θ).

The first interface surface 4 is tapered relative the central axis C with a taper angle α. In this example the taper angle α is approximately 10°.

Figure 2:
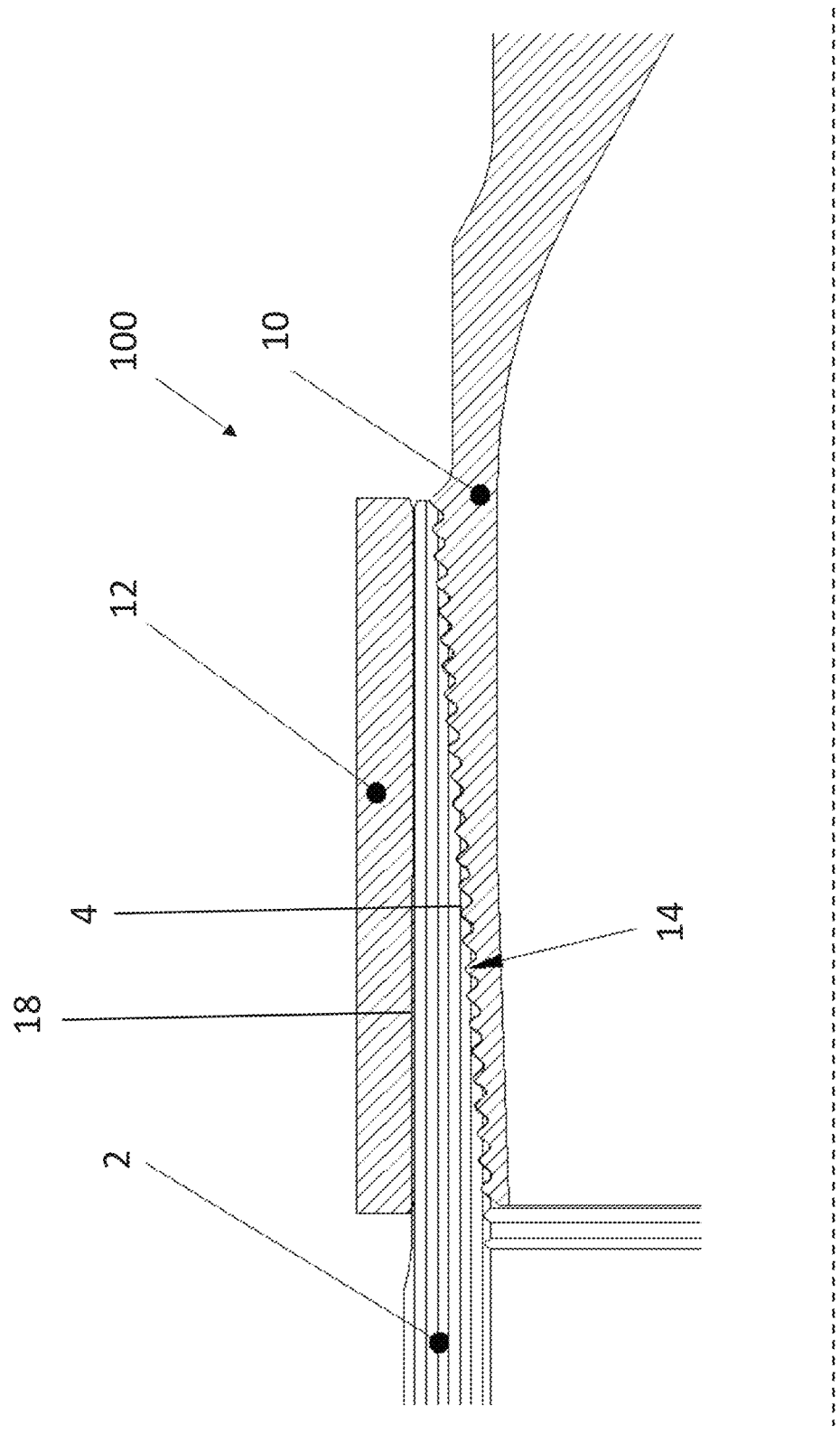
FIG. 2 is a cross sectional view of an assembly according to an example of the present disclosure.

An assembly 100 according to an example of the present disclosure is shown in FIG. 2. The assembly 100 comprises the composite shaft 2 described above, an end fitting 10 and a preload structure 12. The assembly 100 is arranged to transmit axial loads (i.e. parallel to the central axis C) from the end fitting 10 to the composite shaft 2.

Figure 3:
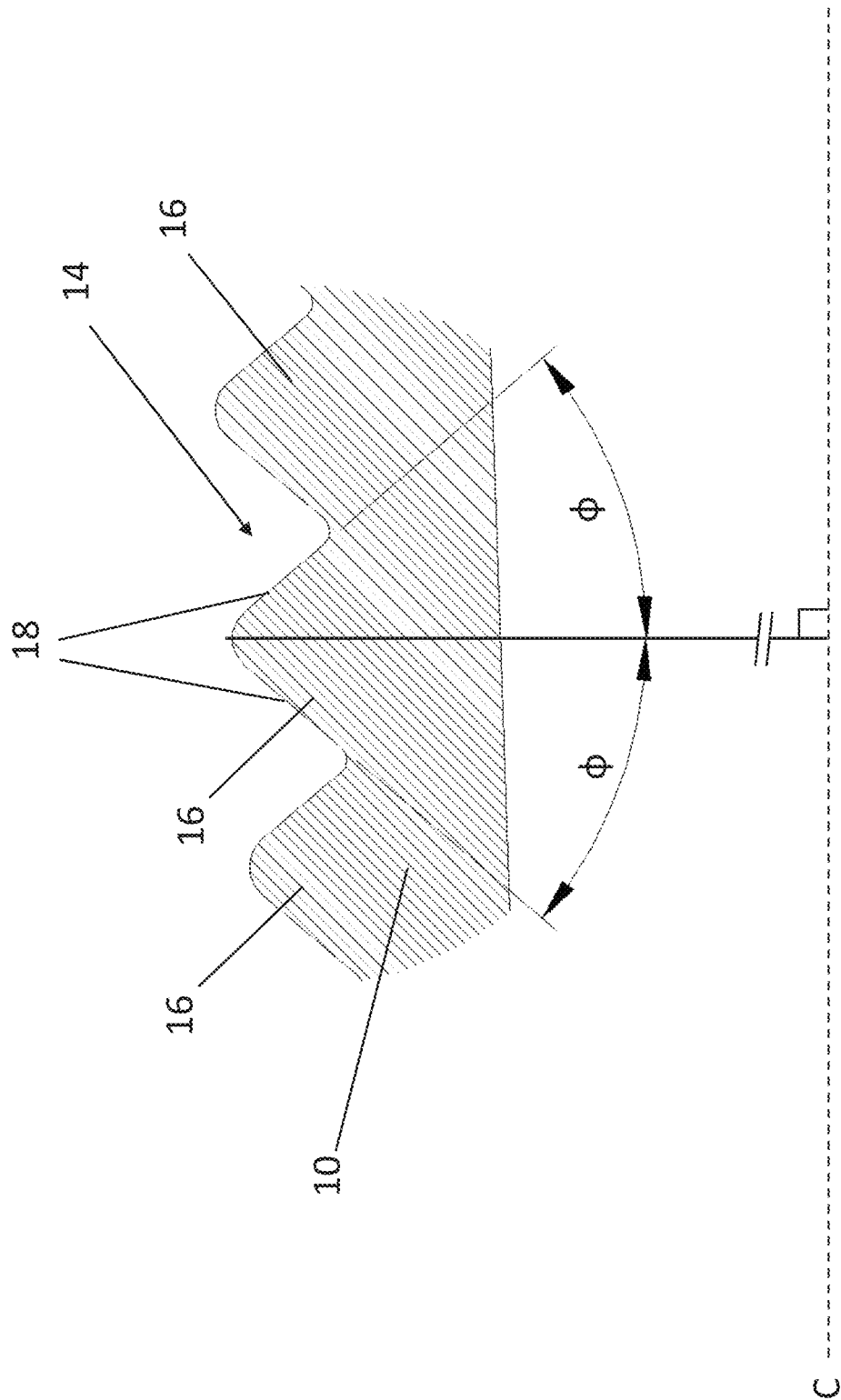
FIG. 3 is a cross sectional view of an end fitting for use in an assembly according to an example of the present disclosure.

The end fitting 10 is shown in more detail in FIG. 3. The end fitting 10 comprises a second interface surface 14 which comprises a series of adjacent ridges 16. The adjacent ridges 16 may be the result of a single helical ridge 16 (or several interleaved helical ridges) passing several times around the circumference of the second interface surface 14 or may simply comprise several circumferential ridges 16. The ridges 16 generally correspond (i.e. in pitch, size and shape) to the grooves 6 of the composite shaft 2, comprising a triangular cross section with two flanks 18. The flank angle φ of the ridge 16 is approximately 40° (i.e. substantially equal to the flank angle θ of the grooves 6). As shown in FIG. 2 and, in more detail in FIG. 4, the ridges 16 of the end fitting 10 and the grooves 6 of the composite shaft 2 are engaged such that the end fitting 10 is mounted to the composite shaft 2. The second interface surface 14 is located radially inward of the first interface surface 4.

The preload structure 12 comprises an annular member that is pressed onto an outer surface 18 of the composite shaft 2 with an interference fit. The interference fit causes the preload structure 12 to exert a radial biasing force on the composite shaft 2 to bias the first interface surface 4 against the second interface surface 14.

Figure 5:
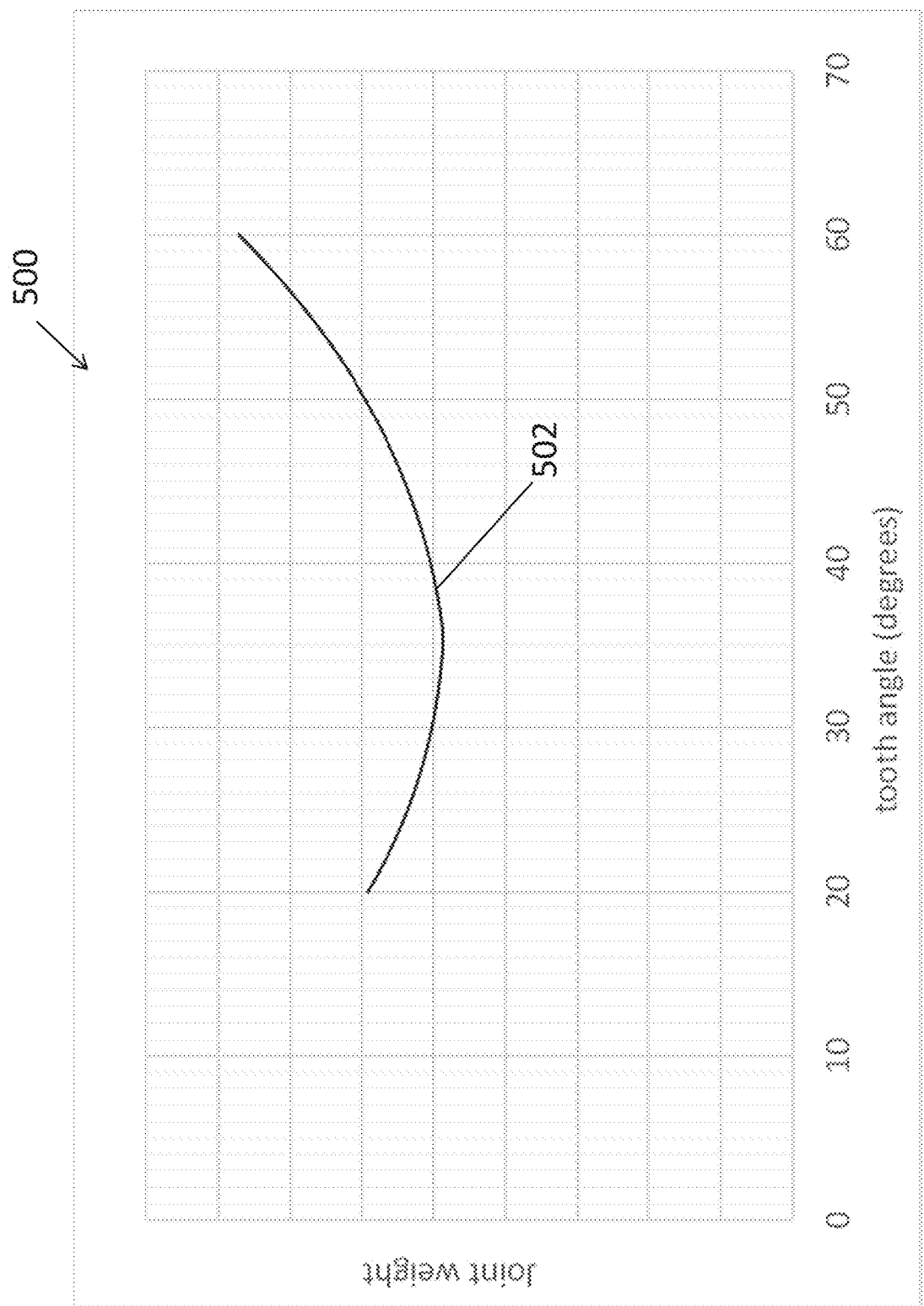
FIG. 5 is a graph showing a weight of an assembly as a function of flank angle.

FIG. 5 illustrates the joint weight of an assembly of an end fitting mounted to a composite shaft with a preload structure as a function of the flank angle (the joint weight being the weight of the assembly in the joining region where the end fitting is mounted to the composite shaft and not including the weight of the rest of the end fitting or composite shaft). Whilst the specific assembly modelled is not shown, it is structurally similar to that described above with reference to FIGS. 1-4.

Figure 6:
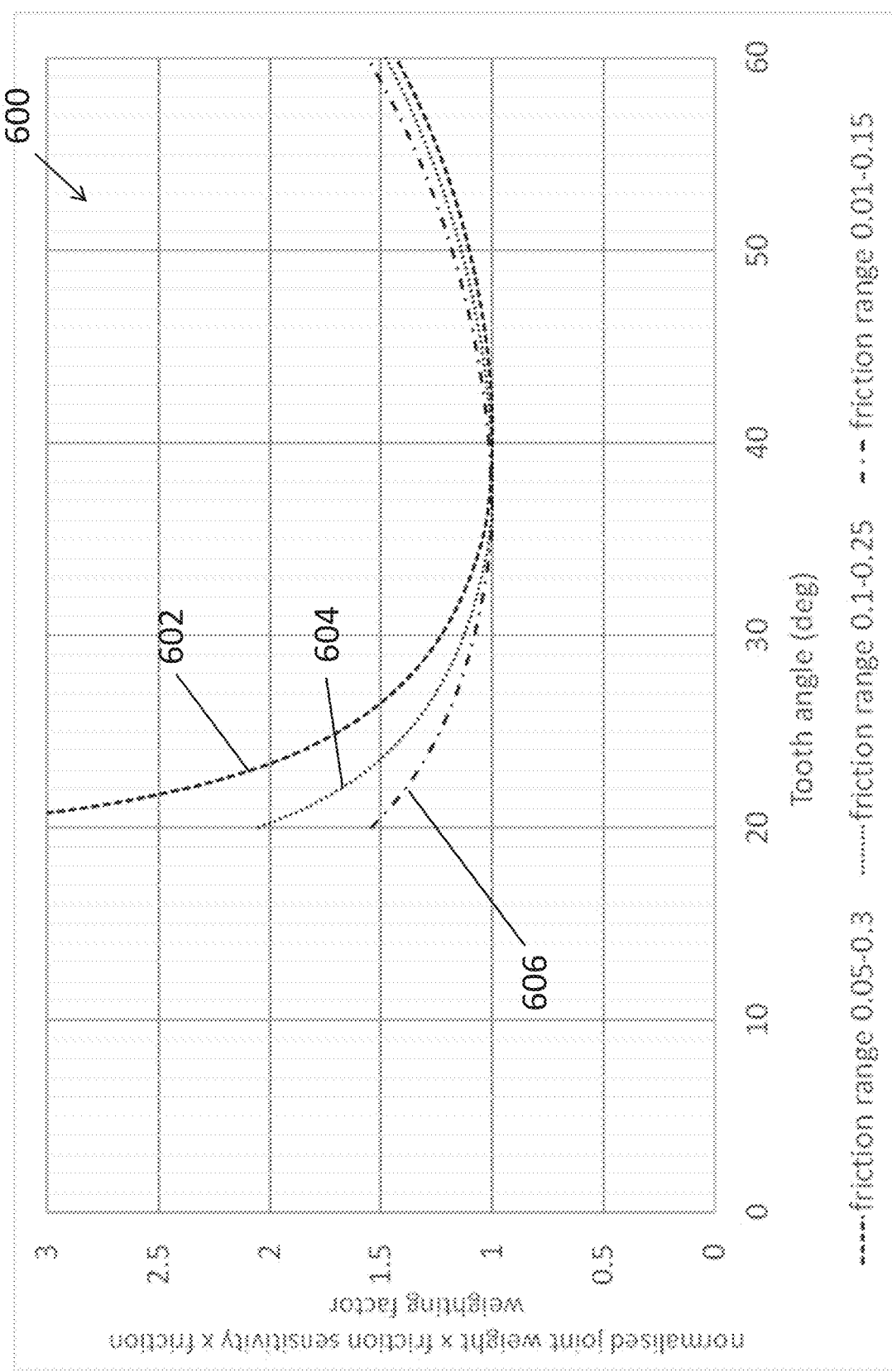
FIG. 6 is a graph showing a measure of performance that takes into account weight and sensitivity to frictional changes of an assembly as a function of flank angle.

The assembly modelled to produce the results shown in FIG. 5 and FIG. 6 comprises a first interface surface with an average radius from the central axis of 22.6 mm, and a length of approximately 30 mm. The composite shaft is made of carbon fibre reinforced polymer (CFRP), and the end fitting is made of steel. However, the benefits realised with this particular assembly are expected to be realised for a wide variety of assemblies with the same flank angles (but perhaps with different materials and/or different dimensions).

From the curve 502 seen in the graph 500 of FIG. 5, it can be seen that a flank angle of between roughly 32° and 36° provides a weight saving over other flank angles, with the optimal flank angle (taking only weight into account) being approximately 32° to 33°.

FIG. 6 illustrates some more modelled properties of the assembly. A graph 600 shows a measure of the performance of the assembly as a function of flank angle. The measure of performance shown in FIG. 6 takes into account not only the joint weight of the assembly but also the sensitivity of the assembly to changes in friction between the first and second interface surfaces (as often occurs during use, e.g. due to changes in environmental conditions such as temperature and/or the presence/absence of lubricating materials between the first and second interface surfaces).

The dashed line 602 shows the properties of the assembly when the coefficient of friction p between the first and second interface surfaces ranges from 0.05-0.3.

The dotted line 604 shows the properties of the assembly when the coefficient of friction p between the first and second interface surfaces ranges from 0.01-0.25.

The dot-dashed line 606 shows the properties of the assembly when the coefficient of friction p between the first and second interface surfaces ranges from 0.01-0.15.

It can be seen that a flank angle of between 32° and 51° provides a benefit over other flank angles when weight and friction sensitivity are taken into account, with the optimal flank angle being approximately 39° or 40°. This benefit is seen even when the coefficient of friction p between the first and second interface surfaces varies by different amounts.

Figure 7:
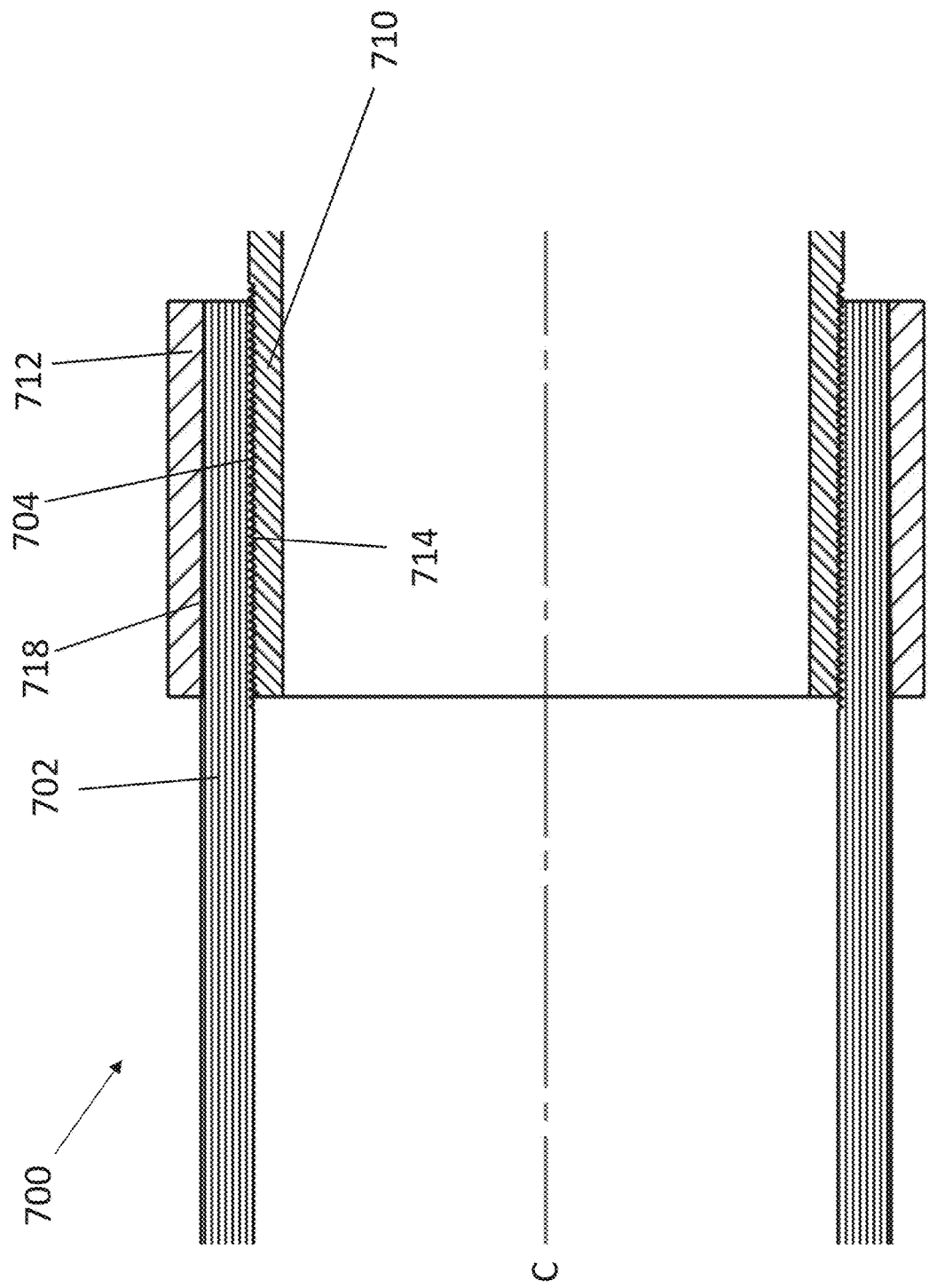
FIG. 7 is a cross sectional view of an assembly according to another example of the present disclosure.

FIG. 7 shows another assembly 700 according to an example of the present disclosure. The assembly 700 comprises a composite shaft 702, an end fitting 710 and a preload structure 712. The assembly 700 is arranged to transmit axial loads (parallel to a central axis C), from the end fitting 710 to the composite shaft 702.

The composite shaft 702 comprises a hollow cylinder with a first interface surface 704 on an inner surface of the hollow cylinder, the first interface surface 704 extending along the central axis C. Although not shown in detail in FIG. 7, the first interface surface 704 comprises a helical groove and/or a plurality of circumferential grooves which have a flank angle of approximately 40° (e.g. as seen in FIG. 1).

The end fitting 710 comprises a second interface surface 714. Although not shown in detail in FIG. 7, the second interface surface 714 comprises a helical ridge and/or a plurality of circumferential ridges which correspond to the helical groove and/or a plurality of circumferential grooves of the composite shaft 702. The helical ridge and/or a plurality of circumferential ridges also have a flank angle of approximately 40°. The end fitting 710 is mounted to the composite shaft 712 through engagement of the first and second interface surfaces 704, 714. The second interface surface 714 is located radially inward of the first interface surface 704.

The preload structure 712 comprises an annular member that is pressed onto an outer surface 718 of the composite shaft 702 with an interference fit. The interference fit causes the preload structure 712 to exert a radial biasing force on the composite shaft 702 to bias the first interface surface 704 against the second interface surface 714.

In contrast to the assembly 2 described with reference to FIGS. 1-4, the first interface surface 704 (and the second interface surface 714) extends parallel to the central axis C (i.e. they are not tapered relative to the central axis C).

FIG. 8 shows yet another assembly 800 according to another example of the present disclosure. Similarly to the above-described assemblies 100, 700, the assembly 800 comprises a composite shaft 802, an end fitting 810 and a preload structure 812. The assembly 800 is arranged to transmit axial loads (parallel to a central axis C), from the end fitting 810 to the composite shaft 802. In contrast to the above-described assemblies 100, 700, however, the assembly 800 is in an inverted configuration in which the end fitting 810 is mounted to the outside of the composite shaft 802, as explained in more detail below.

The composite shaft 802 comprises a hollow cylinder with a first interface surface 804 on an outer surface of the hollow cylinder (in contrast to the alternative assemblies 100, 700 in which the first interface surfaces 14, 704 comprise an inner surface of the composite shafts 2, 702). The first interface surface 804 extends along the central axis C. Although not shown in detail in FIG. 8, the first interface surface 804 comprises a helical groove and/or a plurality of circumferential grooves which have a flank angle of approximately 40° (e.g. as seen in FIG. 1).

The end fitting 810 comprises a second interface surface 814. Although not shown in detail in FIG. 8, the second interface surface 814 comprises a helical ridge and/or a plurality of circumferential ridges which correspond to the helical groove and/or a plurality of circumferential grooves of the composite shaft 802. The helical ridge and/or a plurality of circumferential ridges also have a flank angle of approximately 40°. The end fitting 810 is mounted to the composite shaft 812 through engagement of the first and second interface surfaces 804, 814. As mentioned above, the assembly 800 is in an inverted configuration in which the second interface surface 814 is located radially outward of the first interface surface 804.

The preload structure 812 comprises a plug that is pressed onto an inner surface 818 of the composite shaft 802 with an interference fit (i.e. pressed into the hollow composite shaft 802). The interference fit causes the preload structure 812 to exert a radial biasing force on the composite shaft 802 to bias the first interface surface 804 against the second interface surface 814.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

The invention claimed is:

1. A fibre-reinforced polymer composite shaft for transmitting loads along a central axis, the composite shaft comprising:
   a first interface surface extending along the central axis and comprising at least one helical groove and/or a plurality of circumferential grooves for engaging with at least one corresponding helical ridge and/or a plurality of corresponding circumferential ridges of a second interface surface of an end fitting;
   wherein the at least one helical groove and/or the plurality of circumferential grooves comprises two opposing flanks each having a flank angle of between 32° and 51°, wherein the flank angle is measured between the flank and a perpendicular to the central axis in a plane that contains the central axis.

2. The fibre-reinforced polymer composite shaft as claimed in claim 1, wherein the at least one helical groove or the plurality of circumferential grooves comprises at least one flank with a flank angle of between 34° and 48°.

3. The fibre-reinforced polymer composite shaft as claimed in claim 2, wherein the flank angle is between 37° and 44°.

4. The fibre-reinforced polymer composite shaft as claimed in claim 3, wherein the flank angle is between 37° and 41°.

5. The fibre-reinforced polymer composite shaft as claimed in claim 4, wherein the flank angle is between 38° and 40°.

6. The fibre-reinforced polymer composite shaft as claimed in claim 1, wherein the flank angle is between 32° and 36°.

7. The fibre-reinforced polymer composite shaft as claimed in claim 1, wherein the first interface surface comprises an average radius from the central axis of between 10 and 150 mm.

8. The fibre-reinforced polymer composite shaft as claimed in claim 1, wherein the first interface surface is approximately 30 mm long.

9. The fibre-reinforced polymer composite shaft as claimed in claim 1, wherein the first interface surface is an inner surface of the composite shaft or an outer surface of the composite shaft.

10. The fibre-reinforced polymer composite shaft as claimed in claim 1, wherein the first interface surface is tapered relative to the central axis or the first interface surface extends parallel to the central axis.

11. An assembly for transmitting loads along a central axis, the assembly comprising:
    a fibre reinforced polymer composite shaft as claimed in claim 1;
    an end fitting comprising a second interface surface extending along the central axis and comprising at least one corresponding helical ridge and/or a plurality of corresponding circumferential ridges that is engaged with the at least one helical groove and/or the plurality of circumferential grooves so as to mount the end fitting to the fibre reinforced polymer composite shaft; and
    a preload structure arranged to provide a radial biasing force to bias the first interface surface against the second interface surface.

12. The assembly as claimed in claim 11, wherein the end fitting is metallic.

13. The assembly as claimed in claim 11, wherein the coefficient of friction between the first and second surfaces is between 0.01 and 0.3.

14. The assembly as claimed in claim 13, wherein the coefficient of friction between the first and second surfaces is approximately 0.15.

15. The assembly as claimed in claim 11, wherein the second interface surface is located radially inward of the first interface surface.

16. The assembly as claimed in claim 15, wherein the preload structure comprises an annular member arranged to apply the radial biasing force to an outer surface of the composite shaft.

17. The assembly as claimed in claim 11, wherein the preload structure is arranged in an interference fit with the composite shaft.

18. The assembly as claimed in claim 1, wherein the second interface surface is located radially outward of the first interface surface.

19. The assembly as claimed in claim 18, wherein the preload structure comprises a plug arranged to apply the radial biasing force to an inner surface of the composite shaft.

* * * * *